(12) United States Patent
Geiger (10) Patent No.: US 8,216,460 B2
(45) Date of Patent: Jul. 10, 2012

(54) FLUID PURIFICATION AND MANIFOLD SYSTEMS AND METHODS

(75) Inventor: Kenneth L. Geiger, Pittsburgh, PA (US)

(73) Assignee: Next Generation Filtration Systems, LP, Pittsburgh, PA (US)

( * ) Notice: Subject to any disclaimer, the term of this patent is extended or adjusted under 35 U.S.C. 154(b) by 1199 days.

(21) Appl. No.: 11/948,256

(22) Filed: Nov. 30, 2007

(65) Prior Publication Data

US 2009/0139936 A1 Jun. 4, 2009

(51) Int. Cl.
*B01D 1/22* (2006.01)
*B01D 35/00* (2006.01)

(52) U.S. Cl. ............ 210/184; 210/181; 123/195 A; 196/46.1

(58) Field of Classification Search .......... 123/196 A; 196/46.1; 210/181, 184
See application file for complete search history.

(56) References Cited

U.S. PATENT DOCUMENTS

| | | | |
|---|---|---|---|
| 1,930,006 A | 10/1933 | Fox | |
| 2,078,818 A | 4/1937 | Troxell | |
| 2,331,482 A | 10/1943 | Lamb | |
| 2,446,126 A | 6/1948 | Crake | |
| 2,472,717 A | 6/1949 | Morey | |
| 2,713,422 A * | 7/1955 | James | 210/184 |
| 2,765,259 A | 10/1956 | Schwalge | |
| 2,785,109 A | 3/1957 | Schwalge | |
| 3,575,264 A | 4/1971 | Johnson et al. | |
| 4,184,808 A | 1/1980 | Cobb | |
| 4,272,371 A | 6/1981 | Moses et al. | |
| 4,354,946 A * | 10/1982 | Warlick et al. | 210/774 |
| 4,437,968 A | 3/1984 | Elliott, Jr. | |
| 4,677,929 A | 7/1987 | Harris | |
| 4,753,724 A | 6/1988 | Womble | |
| 4,830,745 A | 5/1989 | van der Meulen | |
| 5,198,104 A | 3/1993 | Menyhert | |
| 5,795,462 A | 8/1998 | Shurtleff | |
| 5,843,284 A | 12/1998 | Waters et al. | |

(Continued)

FOREIGN PATENT DOCUMENTS

WO 8805917 A1 8/1988

(Continued)

OTHER PUBLICATIONS

Oil Purification Systems, Inc. Installation Instructions, Edition 1.0 (Jul. 2006) http://www.oilpursys.com/files/GENERIC%20INSTALLATION%2001-03-2007.pdf (accessed Nov. 28, 2007).

(Continued)

*Primary Examiner* — Nam Nguyen
*Assistant Examiner* — Paul J Durand
(74) *Attorney, Agent, or Firm* — Spilman Thomas & Battle, PLLC (57) ABSTRACT

Apparatuses and methods for filtering particulates and volatiles from fluid systems. The apparatuses and methods include a particulate filter section, an evaporator section positioned adjacent the particulate filter section, and a manifold coupled to at least one of the particulate filter section and the evaporator section to direct flow through the apparatuses as desired.

19 Claims, 8 Drawing Sheets

U.S. PATENT DOCUMENTS

| | | |
|---|---|---|
| 5,882,486 A | 3/1999 | Moore, Jr. |
| RE36,527 E | 1/2000 | Arntz |
| 6,083,406 A | 7/2000 | DePaul et al. |
| 6,139,725 A | 10/2000 | Barr et al. |
| 6,287,455 B1 | 9/2001 | Whitmore |
| 6,493,508 B1 | 12/2002 | Roesgen |
| 6,955,754 B2 | 10/2005 | de Sylva |
| 7,396,473 B1 | 7/2008 | Guynn |
| 2004/0140271 A1 | 7/2004 | Whitmore et al. |
| 2008/0197064 A1 | 8/2008 | Blasco Remacha et al. |
| 2009/0139917 A1 | 6/2009 | Geiger |
| 2010/0025341 A1 | 2/2010 | Priest et al. |

FOREIGN PATENT DOCUMENTS

| | | |
|---|---|---|
| WO | 2006032270 A1 | 3/2006 |
| WO | 2009032285 | 12/2009 |

OTHER PUBLICATIONS

Brochure for PREMO-PLUS filtration system Premo Lubrication Technologies, Inc.

* cited by examiner

FLUID PURIFICATION AND MANIFOLD SYSTEMS AND METHODS

CROSS-REFERENCE TO RELATED APPLICATIONS

None.

FIELD OF THE INVENTION

The present invention is directed to fluid filtration systems and methods. In particular, the fluid filtration systems and methods are directed to systems and methods that remove particulates and volatiles from oil and hydraulic fluid systems.

BACKGROUND OF THE INVENTION

Oils and other fluids are used in various applications, including, for example, lubrication of machinery and to apply hydraulic force to various actuators. Such systems may be substantially closed, as in an engine lubrication application, or open, such as in a hydraulic system having a vented tank. In both those systems, the fluids may be replaced frequently. Such replacement may not be required because the fluid itself is ineffective, but rather because the fluid has become suffused with undesirable materials, such as particulates, water, or uncombusted fuel. Thus, it is believed that there is a need for filtration systems and methods that improve the cleanliness of such fluids to save the costs of labor and replacement fluids. It is furthermore believed that there is a need for filtration systems and methods that improve the cleanliness of such fluids to minimize wasting resources, such as oil and hydraulic fluid, which may continue to be effective once cleaned.

SUMMARY OF THE INVENTION

The present invention is directed to systems, methods and apparatuses for filtering fluids. In accordance with one form of the present invention, there is provided a filtration apparatus having a particulate filter section and an evaporator section. The filtration apparatus also includes a manifold to regulate flow into the particulate filter section and the evaporator section. That manifold may permit flow in series through the particulate filter section and the evaporator section, or through one of the other of the particulate filter section and evaporator section, or through both sections in parallel.

A method of conducting fluid flow from a fluid inlet to a particulate filter section and conducting fluid flow from the fluid inlet to an evaporator section is also provided, as well as a method of conducting fluid flow from a particulate filter section to a fluid outlet and conducting fluid flow from an evaporator section to the fluid outlet.

The present filtration apparatus provides advantages that may include improved fluid heating and volatile removal and the ability to direct fluid into chambers as desired.

Accordingly, the present invention provides solutions to the shortcomings of prior fluid filtration systems and methods. Those of ordinary skill in fluid filtration will readily appreciate, therefore, that those details described above and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of the invention in accordance with a best mode contemplated for carrying out the invention.

DETAILED DESCRIPTION OF THE INVENTION

Reference will now be made in detail to the preferred embodiments of the present invention, examples of which are illustrated in the accompanying drawings. It is to be understood that the figures and descriptions of the present invention included herein illustrate and describe elements that are of particular relevance to the present invention, while eliminating, for purposes of clarity, other elements found in typical systems with which fluid filtration apparatuses and methods are employed.

Any reference in the specification to "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment. References to "or" are furthermore intended as inclusive so "or" may indicate one or another of the ored terms or more than one ored term.

Figure 1:
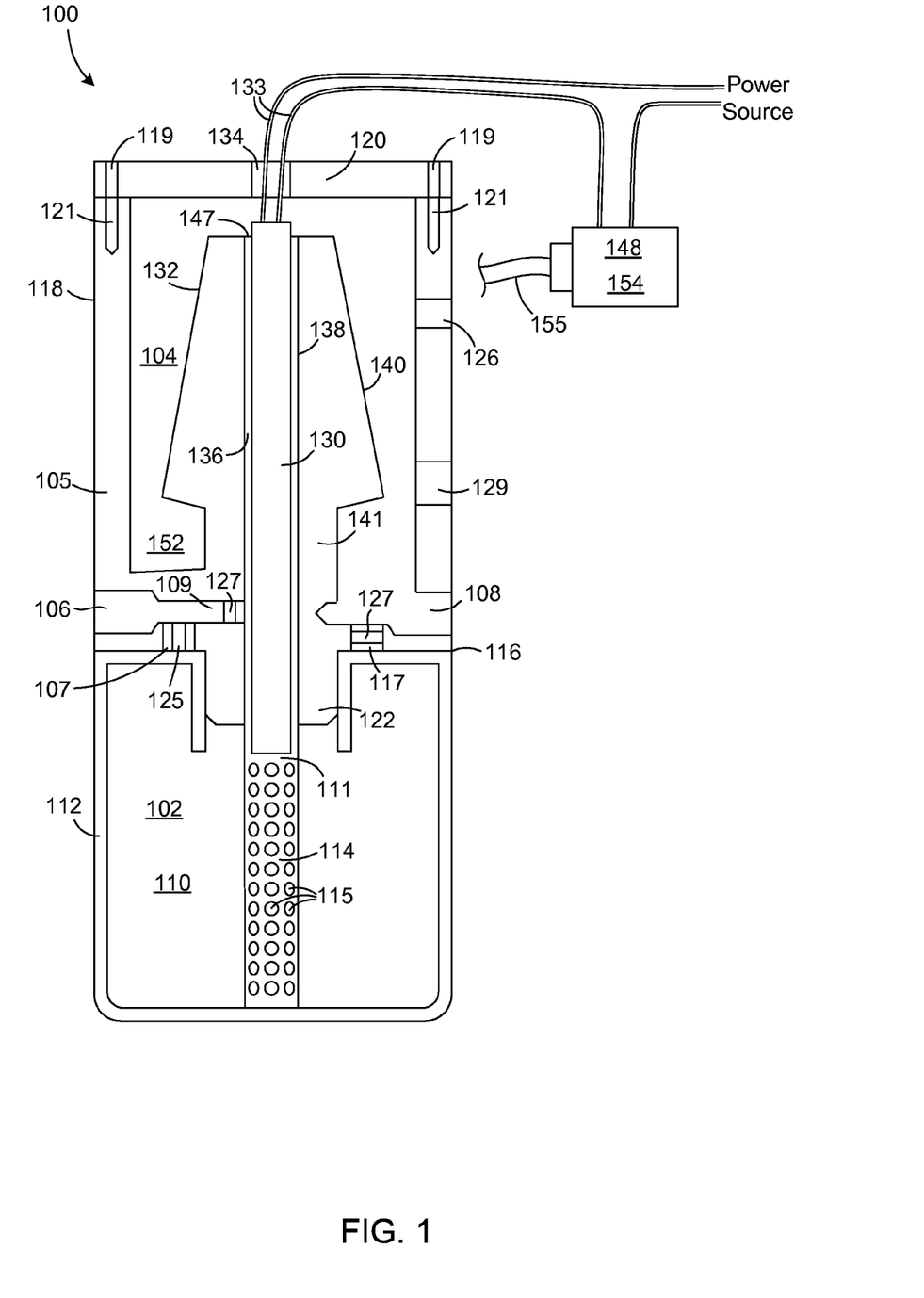
FIG. 1 is a cross-sectional view of an embodiment of a filtration apparatus.

FIG. 1 illustrates a cross-sectional view of an embodiment of a filtration apparatus 100. Filtration apparatus 100 includes a filter chamber 102, an evaporator chamber 104, and a filter base 105. The filter base 105 may be formed of aluminum or another desired material and may be formed by extrusion, machining, casting, or another desired method.

The filtration apparatus 100 may be used in various applications including filtration of lubricants in engines of various types and in pressurized fluid applications such as hydraulic fluid filtration. Oil, hydraulic fluid, or another fluid may pass through the filter chamber 102 and the evaporator chamber 104 in series and in either order or may pass through the filter chamber 102 or the evaporator chamber 104 individually or in parallel.

The filtration apparatus 100 of FIG. 1 includes an inlet 106 having a filter inlet 107 and an evaporator inlet 109, an outlet 108 having a filter outlet 117, and an inner-chamber opening 111. The filter chamber 102 furthermore includes a filter cavity 110, and a filter canister 112. The filter inlet 107, evaporator inlet 109, filter outlet 117, and inner-chamber opening 111 may be individually blocked by caps or plugs 127 to create various flow paths through the filtration apparatus 100.

Figure 5:
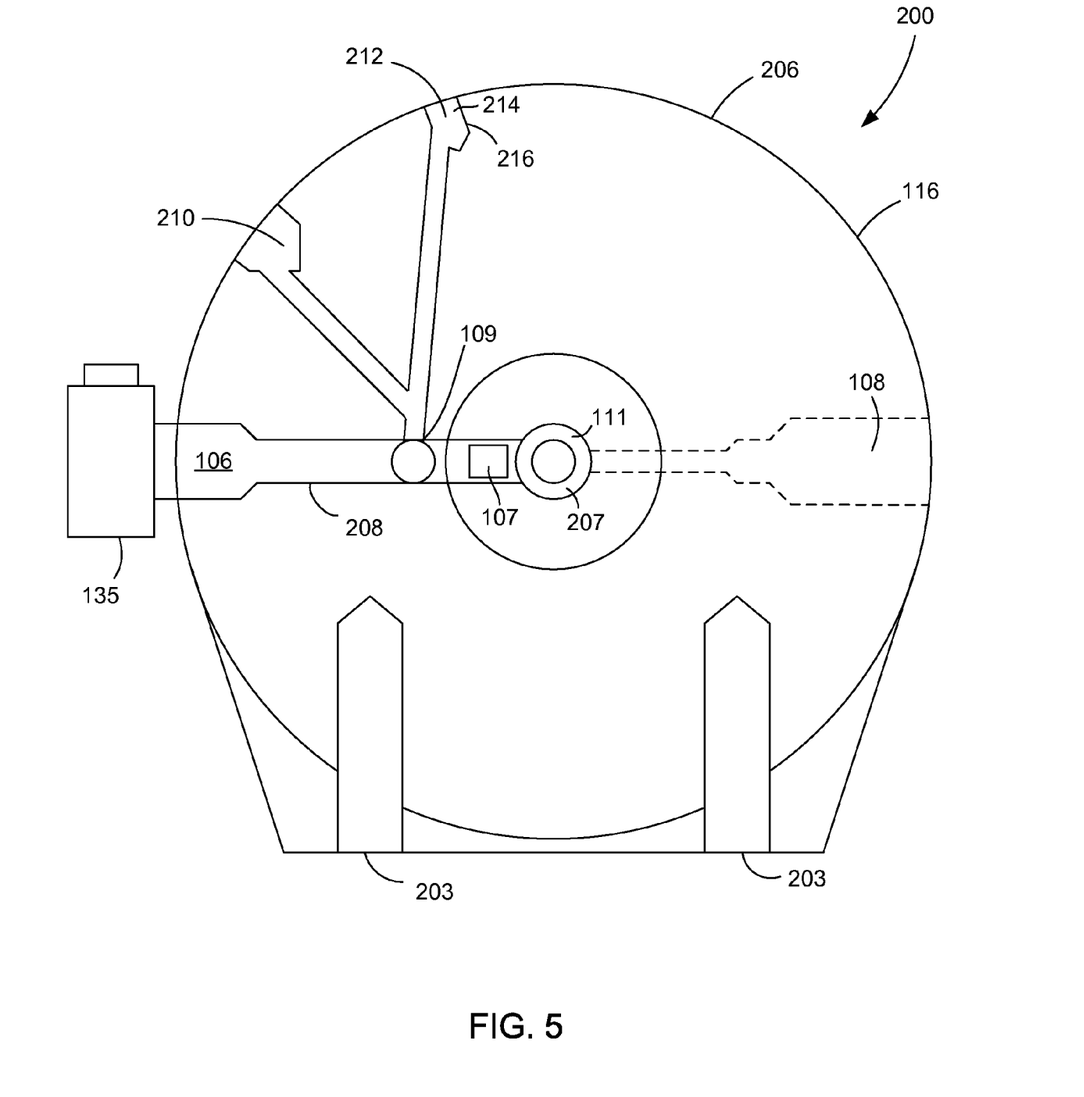
FIG. 5 is a cross-sectional view of an embodiment of a manifold in an embodiment of a filtration device.

An inlet valve 135 may be coupled to the filtration apparatus inlet 106 to control or restrict flow through the filtration apparatus 100, as shown in FIG. 5. An orifice 125 may be placed in the filter inlet 107 to regulate flow through the filtration apparatus 100, for example, when series flow through the filter chamber 102 and evaporator chamber 104 is desired. Alternately, orifices 125 may be placed in the inlet valve 135, filter inlet 107, evaporator inlet 109 or elsewhere as desired. Placement of orifices 125 in each of the inlet valve 135, filter inlet 107, and evaporator inlet 109 may act to regulate flow into each of the filter chamber 102 and evaporator chamber 104 when operating those chambers in parallel and may further create pressure in the inlet 106 to actuate the pressure switch 148 described hereinafter.

In an embodiment wherein series flow through the filter chamber 102 and the evaporator chamber 104 is desired, plugs 127 are placed in the evaporator inlet 109 and the filter outlet 117 as shown in FIG. 1. When so arranged, fluid passes into the filter cavity 110 through the inlet 106 and the filter inlet 107, and passes through a replaceable filter media positioned in the filter cavity 110. The filter chamber 102 includes two paths by which fluid may be discharged from the filter chamber 102, the filter outlet 117 and outlet 108, and the inner-chamber opening 111 that leads to the evaporator chamber 104. Since a plug 127 has been placed in the filter outlet 108 in the embodiment depicted in FIG. 1, fluid is forced to flow from the filter chamber 102 into the evaporation chamber 104 through the inner-chamber opening 111.

In an embodiment in which fluid flow is desired in parallel through both the filter chamber 102 and the evaporator chamber 104, each of the filter inlet 107, evaporator inlet 109, and filter outlet 117 may be opened and the inner-chamber opening 111 may be plugged.

In another embodiment wherein fluid flow is desired through only the filter chamber 102, the evaporator inlet 109, and the inner-chamber opening 111 may be plugged. Similarly, in an embodiment wherein fluid flow is desired through only the evaporator chamber 104, the filter inlet 107, the filter outlet 117, and the inner-chamber opening 111 may be plugged.

The filter canister 112 may be configured for ease of removal from the filtration apparatus 100 to facilitate changing filter media. For example, in one embodiment, the filter media is permanently sited in a replaceable, disposable filter canister 112 and the filter canister 112 is screwed to the filter base 105 similar to a cap on a conventional oil filter.

In the embodiment illustrated in FIG. 1, the inner-chamber opening 111 is coupled to a perforated tube 114 that passes through a central cylindrical opening in the filter media. In that embodiment, the filtered fluid may flow into the perforated tube 114 through the perforations 115 and enter the evaporation chamber 104 through the inner-chamber opening 111. That inner-chamber opening 111 may be aligned with a fluid heating channel 136 in the evaporation chamber 104 so that flow from the filter chamber 102 into the evaporator chamber 104 is directed through the heated space 136 formed between an inner surface 138 of an evaporation tube 132 and a heater 130 described hereinafter.

The filter media may be any type of filter media desired including, for example, paper filters, fiberglass filters, and filters made of various materials that are now or may in the future be available. The filter media may be shaped as a cylinder having a hole in the center through which the perforated tube 114 may be positioned. The filter media may furthermore be pleated to provide a high surface area on which to capture particulates and may be removable and replaceable.

The filter base 105 illustrated in FIG. 1 includes a divider 116 that at least partially separates the filter chamber 102 from the evaporation chamber 104. The filter base 105 may also include a circular wall 118 that extends from the divider 116 to at least partially enclose the evaporation chamber 104. An evaporation chamber cap 120 may be attached to the filter base 105 to cover and provide access to the evaporation chamber 104. The evaporation chamber cap 120 may be attached to the filter base 105 as desired and may, for example, be attached by way of screws extending through holes 119 in the cap 120 and threaded into threaded holes 121 formed in the circular wall 118.

The evaporation chamber cap 120 may be formed of a transparent material, such as glass or transparent or translucent plastic for ease of viewing the operation of the evaporation chamber 104. Alternately, the evaporation chamber cap 120 may be formed of aluminum or another material for severe duty or other applications.

A threaded circular portion 122 may also extend from the divider 116 opposite the circular wall 118 for attachment of the filter canister 112.

The evaporator chamber 104 further includes a heater wiring inlet 134, a heater 130, an evaporation tube 132, an evaporator gas inlet 129, and an evaporator gas outlet 126. To enhance removal of airborne volatiles, an air flow stream may be created through the evaporator chamber 104 through the evaporator gas inlet 129 and the evaporator gas outlet 126. For example, the evaporator gas inlet may be in fluid communication with a pressurized air source such as a turbocharger or an engine crankcase. Alternately or in addition, the evaporator gas outlet 126 may be in fluid communication with a vacuum air source such as a combustion air intake or an air cleaner. Fluid communication may be facilitated by connecting tubing to the evaporator gas inlet 129 and the pressurized air source or connecting the evaporator gas outlet 126 to the vacuum air source.

In the embodiment illustrated in FIG. 1, the evaporation tube 132 is fitted around the heater 130 and fluid passes from the filter chamber 102 into the evaporator chamber 104 through a heated space 136 formed between the heater 130 and an inner surface 138 of the evaporation tube 132. The heated fluid then passes over an outer surface 140 of the evaporation tube 132 and volatiles, such as water and uncombusted fuel, may become gaseous and those gasses may be vented from the evaporator chamber 104 through the evaporator gas outlet 126.

Figure 7:
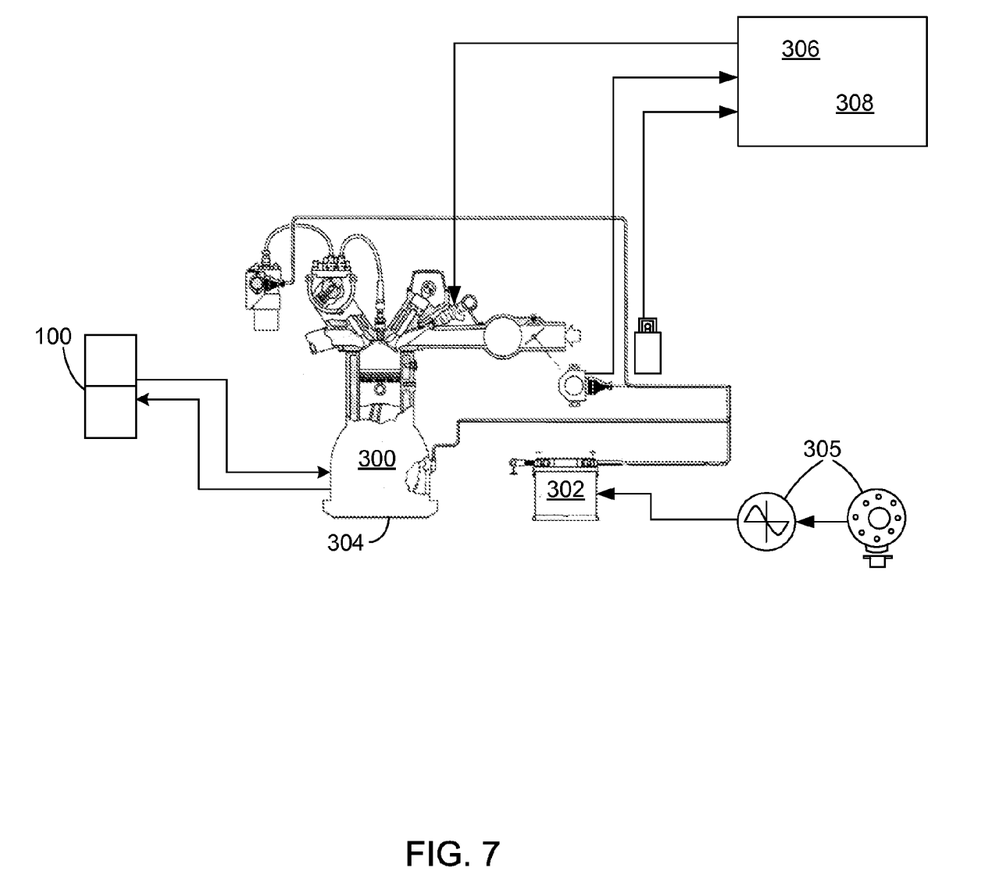
FIG. 7 is an illustration of an embodiment of an engine incorporating a filtration apparatus.

In an embodiment, the heater 130 is an electrically powered heater 130 having wires 133 that pass from the heater 130, through a heater wiring opening 134 to an electrical source. In automotive applications, for example, that electrical source may be a battery 302 or a generator 305, as illustrated in FIG. 7. Alternately, another power source may serve to power the heater 130.

Figure 2:
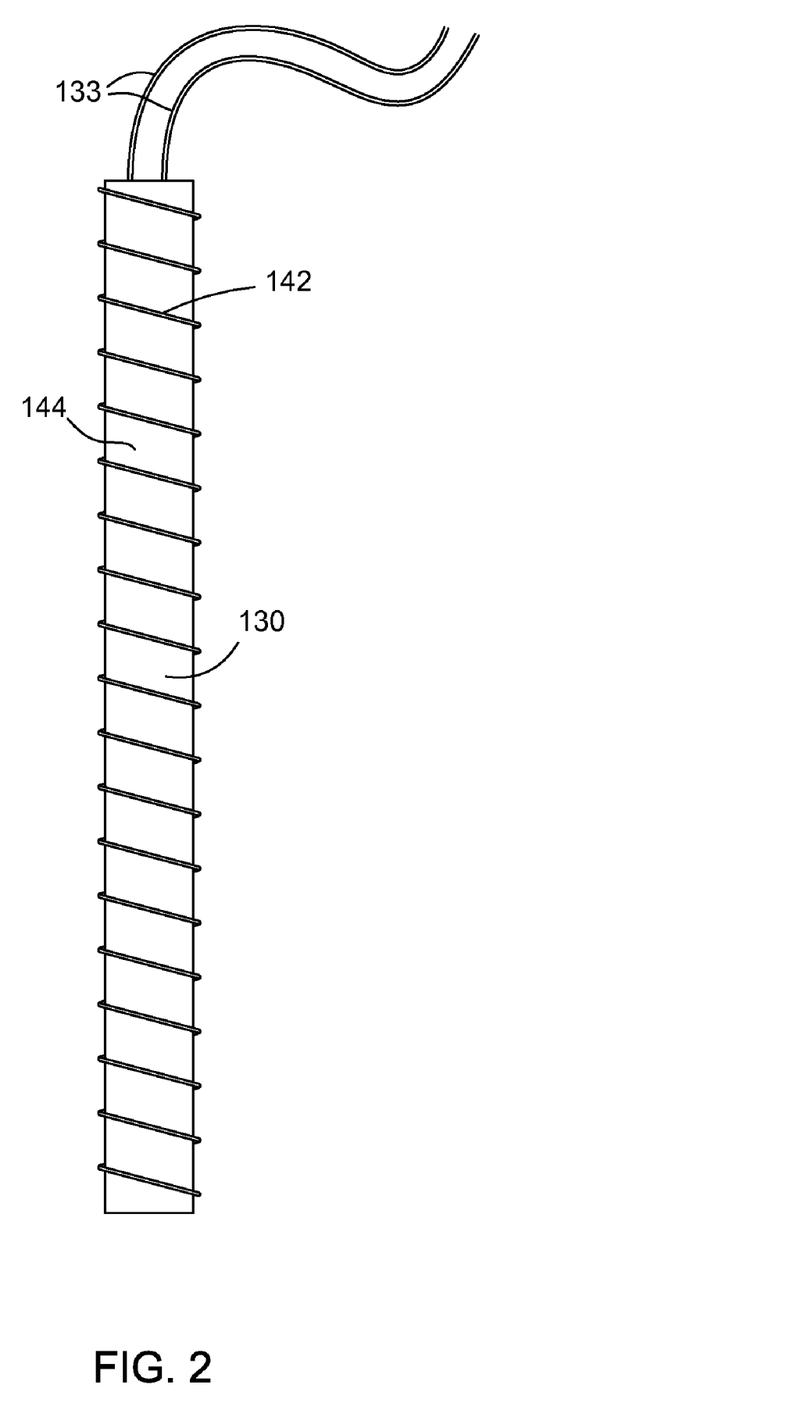
FIG. 2 is a side view of an embodiment of an evaporation chamber heater for an embodiment of a filtration device.

FIG. 2 illustrates an embodiment of the heater 130 having a surface 144 and a wire 142 wound helically along the surface 144 of the heater 130. A ridge or groove may be formed on the surface 144 of the heater 130 or the inner surface 138 of the evaporation tube 132 rather, or in addition to using the wire 142 winding. Alternately, other shapes may be formed on the heater 130 or evaporator tube 132, or other apparatuses may be placed between the heater 130 and the inner surface 138 of the evaporation tube 132 in any desired way to increase the duration the fluid remains proximate to or near the heater to improve fluid heating.

The evaporation tube 132 may be fitted over or around the heater 130 and its wire 142 winding, thereby creating a fluid heating channel 136 between an inner surface 138 of the evaporation tube 132 and the surface 144 of the heater 130 through which fluid may flow into the evaporator chamber 104. Furthermore, the evaporation tube 132 may be fitted over the heater 130 such that at least a portion of the fluid passing between the inner surface 138 of the evaporation tube 132 and the heater 130 flows along a path defined between the wire 142 windings or along the ridges or grooves. Creating a narrow fluid heating channel 136 between the inner surface 138 of the evaporation tube 132 and the surface 144 of the heater 130 promotes fluid contact with or near the surface 144 of the heater 130. Inclusion of grooves, ridges, or the wire 142 winding further promotes such contact for a longer period of time than would occur if the fluid were directed between a smooth heater 130 and a smooth inner surface 138 of the evaporation tube 132. Such a prolonged exposure to the heater 130, in turn, permits greater heat transfer to the fluid from the heater 130 as the fluid passes by the heater 130.

Figure 3:
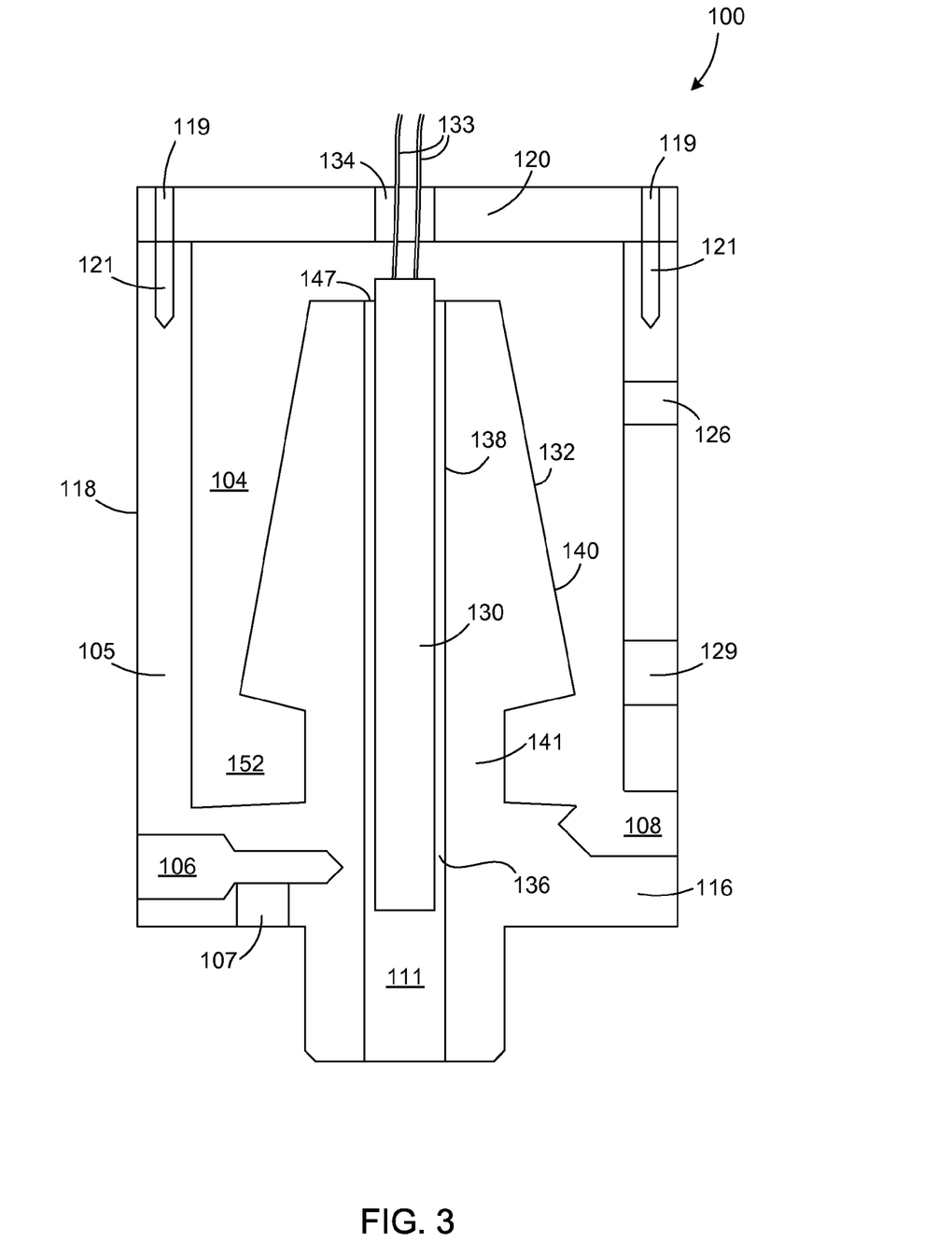
FIG. 3 is a cross-sectional view of an embodiment of an evaporation chamber in a filtration device that may be suitable for use with a small engine.
Figure 4:
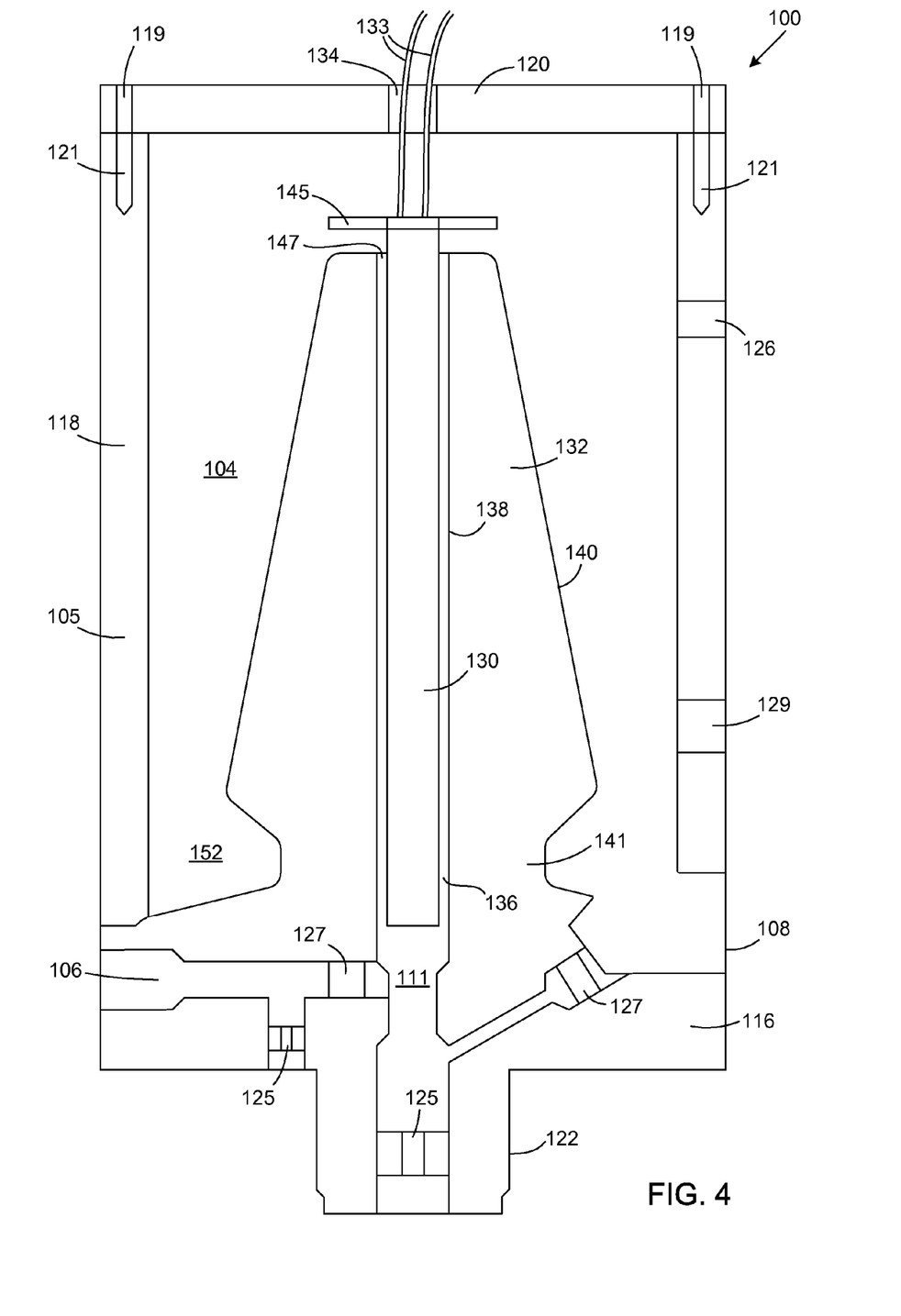
FIG. 4 is a cross-sectional view of an embodiment of an evaporation chamber in a filtration device that may be suitable for use with a hydraulic system.

The heated fluid flows out from the evaporator end 147 of the evaporation tube 132 after it passes through the fluid heating channel 136. FIGS. 3 and 4 depict filtration apparatuses 100 configured for improved performance in various applications. As illustrated in FIG. 4, a splash guard 145 may be located above the evaporation tube 132 in applications where, for example, fluid pressure in the fluid heating channel 136 is such that the fluid may be propelled against the evaporation chamber cap 120 or where fluid exiting the evaporation tube 132 is desired to be directed by use of such a splash guard 145. Fluid flowing from the evaporation tube 132 may then flow down the outer surface 140 of the evaporation tube 132.

The evaporation tube 132 may be in contact with the divider 116 and may furthermore be attached to the divider 116 or formed with the divider 116. The evaporation tube 132 may also be shaped variously. In one embodiment the evaporation tube 132 has a conically shaped outer surface 140 that is pinched 141 near where the evaporation tube 132 meets the divider 116, as is illustrated in FIGS. 1, 3, and 4. The pinched portion 141 of the evaporation tube 132 may have a circumference that is less than the circumference of the evaporation tube 132 at the widest part of the conical shape.

The conical shaped evaporation tube 132 outer surface 140 provides a surface that the fluid can flow along in a thin film to enhance evaporation of volatiles. Heat may furthermore be transferred to the evaporation tube 132 from the heater 130 and the pinched portion 141 may reduce heat transfer from the evaporation tube 132 to the divider 116 and the filter base 105. The pinched portion 141 may also enhance the transfer of volatiles from the fluid to the surrounding air by causing the fluid to fall through the air to a fluid reservoir 152 in the evaporation chamber 104.

A safety sensor 154 may be employed in the filtration apparatus 100 to de-energize the heater 130, thus preventing the fluid from becoming overheated. Various types of sensors 154 may be employed including, for example, a temperature sensor (not shown) disposed in the filtration apparatus 100 adjacent or near the fluid, a fluid flow sensor (not shown) disposed in the filtration apparatus 100 to sense fluid flow, or a pressure sensor 148 sensing fluid pressure in the filtration apparatus 100. The temperature sensor may operate to de-energize the heater 130 if the temperature of the fluid or the filtration apparatus 100 exceeds a desired temperature. The flow sensor may operate to de-energize the heater 130 if the fluid flow rate drops below a desired flow rate. The pressure sensor 148 may be attached directly, through tubing 155, or as desired to a pressure sensor port 210 as described hereinafter in connection with FIG. 5. That pressure sensor 148 may operate to de-energize the heater 130 if the fluid pressure drops below a desired pressure, potentially indicating low fluid flow. It may be noted that low fluid flow could cause the temperature of the fluid in the vicinity of the heater 130 to become overheated if the heater 130 remained energized.

The safety sensor 154 may operate in various ways including incorporation of an electrical contact in the safety sensor 154 through which the wiring that energizes the heater 130 passes. In such an embodiment, the contact may close when it is safe to heat the fluid and the contact may open when it is unsafe to heat the fluid. Alternately, the safety sensor 154 may be coupled to a processor 306, such as the engine control unit 308 illustrated in FIG. 7, and the heater 130 may be operated through an output of the processor 306 such that the heater 130 operates only when fluid conditions are safe for heater 130 operation.

FIG. 3 illustrates an evaporation chamber 104 having a filter base 105 configured for series fluid flow through the filter chamber 102 (not shown) and the evaporator chamber 104. Fluid flows into a filter chamber 102 similar to that shown in FIG. 1 through the inlet 106 and filter inlet 107. Fluid then flows from the filter chamber 102 into the evaporator chamber 104 through the inner-chamber opening 111. After passing through the fluid heating channel 136, the fluid exits the evaporator chamber 104 through the outlet 108.

FIG. 4 illustrates an evaporator chamber 104 having a configurable porting arrangement and including a splash guard 145.

FIG. 5 illustrates a manifold 200 that includes a porting arrangement for an embodiment of a filtration apparatus 100 that is similar to the porting arrangement illustrated in FIG. 4. That manifold 200 is disposed in the divider 116 between the filter chamber 102 and the evaporator chamber 104 in the embodiment illustrated, but may be arranged otherwise as desired. Attachment of the filtration apparatus to a mounting base, such as a housing surrounding an engine or a wall near a hydraulic expansion tank, may be accomplished through screws threaded through the mounting base into screw holes 203 in the divider 116 or otherwise as desired.

A fluid intake port 106 extends from an outer edge 206 of the divider 116 through the divider 116 to an interior cavity 207 of the filtration apparatus 100 in which the fluid is disposed in the embodiment illustrated in FIG. 5. The fluid intake port 106 permits fluid to enter the filtration apparatus 100 and travel along a fluid intake channel 208. The fluid intake port 106 may divide into a filter inlet 107 and an evaporator inlet 109 as illustrated in FIGS. 1 and 4, or may channel fluid directly into the filter chamber 102 as illustrated in FIG. 3.

A pressure sensor port 210 extends from the fluid intake channel 208 to the outer edge 206 of the divider 116. The pressure sensor port 210 may be of any known type including an open port with a removable cap or plug, a type having a check valve or other arrangement that permits a pressure sensor 148 to sense pressure without permitting fluid to flow out through the pressure sensor port 210, or be arranged for direct attachment of a pressure sensor 148 or other sensor. The pressure sensor 148 or other sensor, such as safety sensor 154, may be coupled to the pressure sensor port 210 directly, by way of a tube 155, or otherwise to actuate the sensor 148, 154.

A test sample port 212 also extends from the fluid intake channel 208 to the outer edge 206 of the divider 116. The test sample port 212 may, for example, include a ¼ inch test sample bore 214 having a ¼ inch test sample thread 216 extending into the divider 116 from its outer edge 206. The pressure sensor port 210 may be configured similarly or otherwise as desired.

Figure 6:
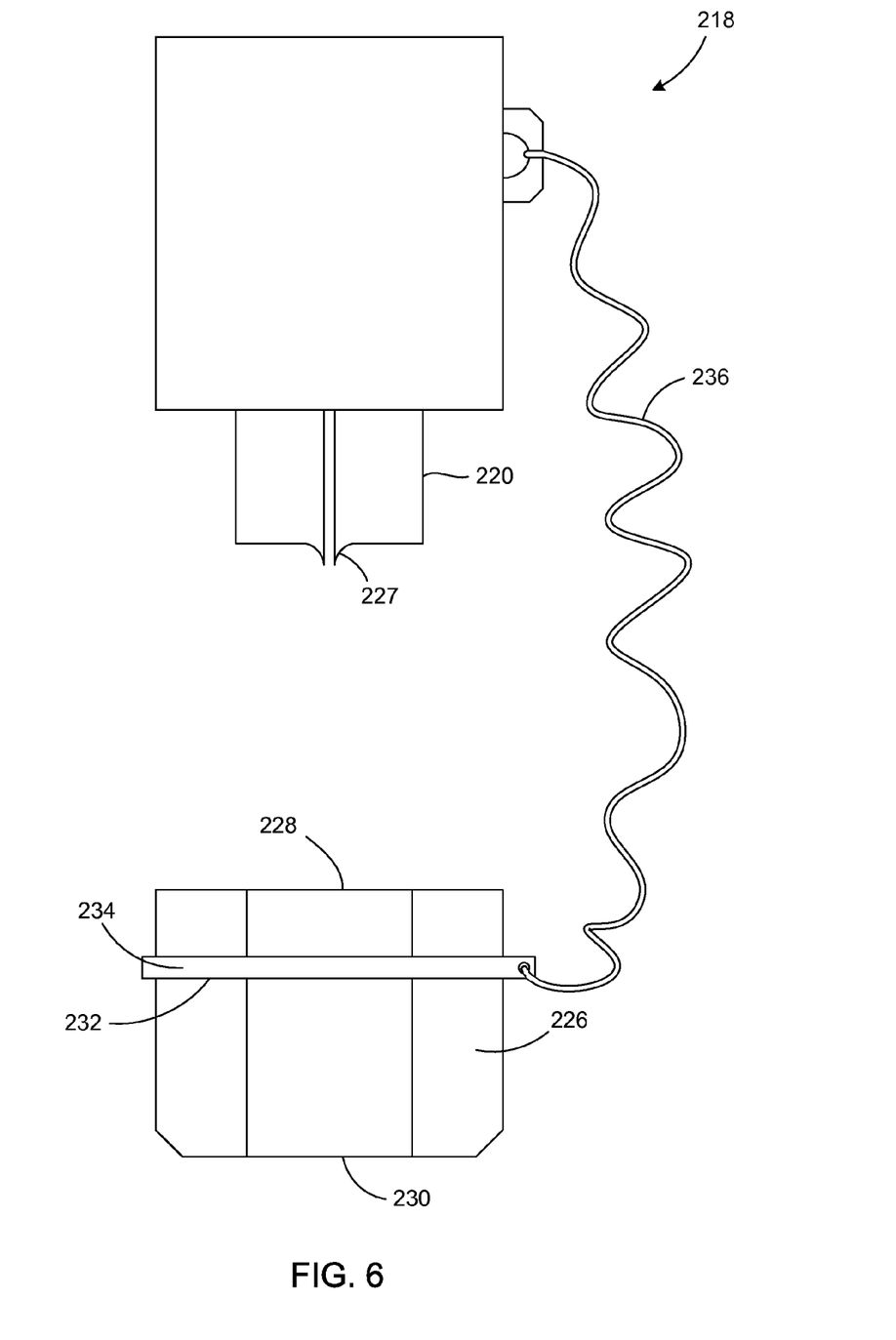
FIG. 6 is a cross-sectional view of an embodiment of a fluid sample valves.

FIG. 6 illustrates an embodiment of a fluid sample valve 218 that may be coupled to the test sample port 212. The fluid sample valve 218 is threaded to the test sample thread 216 in that embodiment. The fluid sample valve 218 may have a threaded outlet 220, and a removable test sample cap 226 may be coupled to the threaded outlet 220. The threaded outlet 220 terminates in an outlet point 227 that can pierce a cover placed over a test vessel, in one embodiment. In that way, clean test samples of the fluid may be taken by removing the test sample cap 226, piercing the test vessel cover with the outlet point 227 of the fluid sample valve 218, opening the fluid sample valve 218, and permitting fluid to drain into a test vessel, for example.

In an embodiment, the test sample cap 226 may be threaded around its circumference on a first cap end 228 to fit the test sample thread 216 and hexagonal around its circumference on a second cap end 230 to facilitate removal of the cap with a wrench. Other configurations of the cap, including use of a hexagonal depression in the end of the cap in which an Allen wrench may be fitted, or another desired configuration are also contemplated herein. The test sample cap 226 may also have a groove 232 around its circumference into which a snap ring 234 may be placed and the snap ring 234 may be attached to a tether 236, such as a chain or a flexible coupler made of nylon or another desired material.

Fluid samples removed from the filtration apparatus 100, through the test sample port 212, for example, may be tested to determine whether they are suitable for continued use or should be replaced. Thus, the test sample port 212 may have various uses, including serving as assurance that the fluid has the appropriate qualities and is functioning as desired.

Any, all, or none of the pressure sensor port 210, test sample port 212, and the fluid sample valve 218 may be provided in any desired embodiment.

FIG. 7 illustrates an embodiment of an engine 300 incorporating a filtration apparatus 100. The engine 300 is an internal combustion engine for an automobile and the filtration apparatus 100 is for the engine 300 lubrication system in the embodiment illustrated. It should be noted, however, that the filtration apparatus 100 may be used with any engine 300 and to purify any fluid.

The engine 300 includes a battery 302 and a generator 305, either of which may be utilized to power the heater 130 of the filtration apparatus 100. The engine 300 also includes a lubrication system having a pump 304 that pumps the lubricant through the engine 300 and the filtration apparatus 100.

Figure 8:
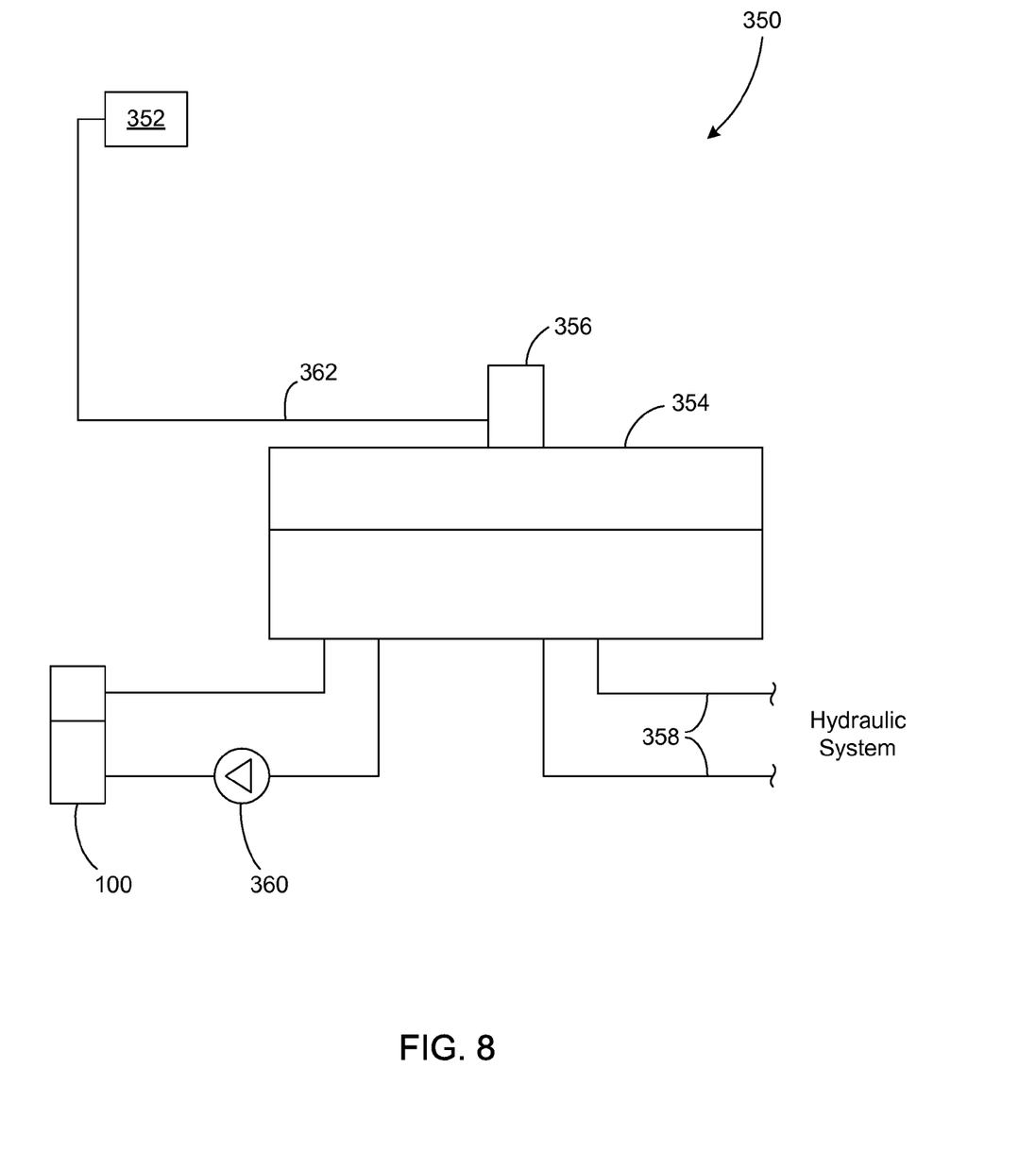
FIG. 8 is an illustration of an embodiment of a hydraulic system incorporating a filtration apparatus.

FIG. 8 illustrates a hydraulic system 350 incorporating a filtration apparatus 100 and an inlet filter 352. The hydraulic system 350 includes an expansion tank 354 having an inlet breather 356 and one or more tubes 358 through which hydraulic fluid flows as required by the equipment using the hydraulic fluid.

Air moves into and out of the expansion tank 354 as the hydraulic tank 354 level changes due, generally, to demand from the equipment using the hydraulic fluid. The inlet filter 352 is attached to the inlet breather 356 by tubing 362 to clean air moving into the expansion tank 354. Such use of the inlet filter 352 minimizes the introduction of contaminants present in the air drawn into the expansion tank 354.

The filtration apparatus 100 operates as described herein to purify the hydraulic fluid. The filtration apparatus 100 may be coupled to the tank and a pump 360 may be employed to circulate hydraulic fluid through the filtration apparatus 100. Alternately or in addition, one or more filtration apparatuses 100 may be positioned in various locations throughout the hydraulic system to remove particulates and volatiles from the hydraulic fluid.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A fluid purification apparatus, comprising:
   a particulate filter section;
   an evaporator section positioned above the particulate filter section;
   and a manifold coupled to the particulate filter section and the evaporator section, the manifold having;
   an inlet;
   a filter inlet connected at a first end to the inlet and connected at a second end to the particulate filter section; and
   an evaporator inlet connected at a first end to the inlet and connected at a second end to the evaporator section.

2. The filtration apparatus of claim 1, wherein the manifold further comprises a plug positioned in the evaporator inlet.

3. The filtration apparatus of claim 1, wherein the manifold further comprises an orifice positioned in the filter inlet.

4. The filtration apparatus of claim 1, wherein the manifold further comprises an inner-chamber opening in fluid communication with the particulate filter section and the evaporator section.

5. The filtration apparatus of claim 4, wherein the manifold further comprises a plug positioned in the inner-chamber opening.

6. The filtration apparatus of claim 1, wherein the manifold further comprises a port in fluid communication with an interior cavity of the filtration apparatus.

7. The filtration apparatus of claim 6, further comprising a fluid sample valve having an inlet connected to the port and a sharp outlet.

8. A fluid purification apparatus, comprising:
   a particulate filter section;
   an evaporator section positioned above the particulate filter section;
   and a manifold coupled to the particulate filter section and the evaporator section, the manifold having;
   an outlet;
   a filter outlet directly connected at a first end to the outlet and connected at a second end to the particulate filter section; and
   an evaporator outlet connected at a first end to the outlet and connected at a second end to the evaporator section.

9. The filtration apparatus of claim 8 further comprising an inner-chamber opening that is in fluid communication with the filter outlet and in fluid communication with the evaporator section.

10. The filtration apparatus of claim 9, wherein the manifold further comprises a plug positioned in the inner-chamber opening.

11. The filtration apparatus of claim 9 wherein the manifold further comprises an orifice positioned in the inner-chamber opening.

12. The filtration apparatus of claim 8 wherein the manifold further comprises a plug positioned in the evaporator inlet.

13. A filtration apparatus, comprising:
   a particulate filter section;
   an evaporator section positioned above the particulate filter section;

and a manifold coupled to the particulate filter section and the evaporator section, the manifold having;

an inlet;

a filter inlet connected at a first end to the inlet and connected at a second end to the particulate filter section;

an evaporator inlet connected at a first end to the inlet and connected at a second end to the evaporator section;

an outlet;

a filter outlet directly connected at a first end to the outlet and connected at a second end to the particulate filter section; and an evaporator outlet connected at a first end to the outlet and connected at a second end to the evaporator section.

14. The filtration apparatus of claim 13 further comprising an inner-chamber opening that is in fluid communication with the evaporator inlet, in fluid communication with the evaporator section, in fluid communication with the filter outlet, and in fluid communication with the particulate filter section.

15. The filtration apparatus of claim 14, wherein the manifold further comprises a plug positioned in the inner-chamber opening.

16. The filtration apparatus of claim 13 wherein the manifold further comprises a plug positioned in the evaporator inlet.

17. The filtration apparatus of claim 13 wherein the manifold further comprises an orifice positioned in the filter inlet.

18. The filtration apparatus of claim 13 wherein the manifold further comprises a plug positioned in the filter outlet.

19. The filtration apparatus of claim 13 wherein the manifold further comprises an orifice positioned in the inner chamber opening.

* * * * *